US010789057B2

(12) United States Patent
Vichare et al.

(10) Patent No.: US 10,789,057 B2
(45) Date of Patent: Sep. 29, 2020

(54) PREDICTING A SUCCESS RATE OF DEPLOYING A SOFTWARE BUNDLE

(71) Applicant: Dell Products L. P., Round Rock, TX (US)

(72) Inventors: Nikhil M. Vichare, Austin, TX (US); Arturo Ramos, Jr., Austin, TX (US); Abhinav Gupta, Austin, TX (US)

(73) Assignee: Dell Products L.P., Round Rock, TX (US)

(*) Notice: Subject to any disclaimer, the term of this patent is extended or adjusted under 35 U.S.C. 154(b) by 119 days.

(21) Appl. No.: 16/036,102

(22) Filed: Jul. 16, 2018

(65) Prior Publication Data
US 2020/0019393 A1    Jan. 16, 2020

(51) Int. Cl.
| | |
|---|---|
| *G06F 8/60* | (2018.01) |
| *G06F 8/65* | (2018.01) |
| *G06F 8/61* | (2018.01) |
| *G06N 20/00* | (2019.01) |
| *G06N 5/04* | (2006.01) |

(52) U.S. Cl.
CPC .............. *G06F 8/60* (2013.01); *G06N 20/00* (2019.01); *G06F 8/61* (2013.01); *G06F 8/65* (2013.01); *G06N 5/04* (2013.01)

(58) Field of Classification Search
CPC .................................... G06F 8/61; G06F 8/65
See application file for complete search history.

(56) References Cited

U.S. PATENT DOCUMENTS

| | | | | |
|---|---|---|---|---|
| 2010/0191952 A1* | 7/2010 | Keinan | .................. | G06Q 10/06 713/100 |
| 2012/0331455 A1* | 12/2012 | Ayachitula | ................ | G06F 8/65 717/171 |
| 2015/0186125 A1* | 7/2015 | Avery | ................. | G06F 9/44578 717/174 |
| 2016/0105504 A1* | 4/2016 | Vallabhaneni | ...... | H04L 67/1095 709/217 |
| 2016/0308733 A1* | 10/2016 | Chauhan | ................. | H04L 67/36 |
| 2017/0034023 A1* | 2/2017 | Nickolov | ............ | H04L 43/0817 |
| 2018/0260201 A1* | 9/2018 | Liu | ....... | G06F 11/0778 |
| 2018/0285092 A1* | 10/2018 | Raman | ....................... | G06F 8/65 |
| 2019/0108465 A1* | 4/2019 | Zhou | ................. | G06Q 10/0635 |
| 2019/0205542 A1* | 7/2019 | Kao | ......................... | G06F 8/70 |

(Continued)

*Primary Examiner* — Qing Chen
*Assistant Examiner* — Binh Luu
(74) *Attorney, Agent, or Firm* — Campbell Stephenson LLP; Shiv S. Naimpally

(57) ABSTRACT

In some examples, a server may determine a plurality of variables associated with a software package. For example, the plurality of variables may include a size of the software package, a reboot variable associated with the software package indicating whether a reboot is to be performed after installing the software package, and an installation type indicating whether the software package is a first install or an upgrade. The server may execute a machine learning model to determine, based on the plurality of variables, a risk score predicting an installation success rate of the software package. The server may select a deployment strategy from a plurality of deployment strategies based at least in part on the risk score and the plurality of variables. The server may provide the software package to a plurality of computing devices in accordance with the deployment strategy.

20 Claims, 6 Drawing Sheets

(56) References Cited

U.S. PATENT DOCUMENTS

| | | | | |
|---|---|---|---|---|
| 2019/0294525 A1* | 9/2019 | Scheiner | ............. | G06F 11/3608 |
| 2019/0310929 A1* | 10/2019 | Wright | ...................... | G06F 8/65 |
| 2019/0370657 A1* | 12/2019 | Chen | ........................ | G06F 8/62 |
| 2020/0034133 A1* | 1/2020 | Dattatri | ............... | H04L 43/0817 |

* cited by examiner

SOFTWARE PACKAGE VARIABLES (P) 202
P1: PACKAGE TYPE: NATIVE/UNIVERSAL APPLICATION, BIOS, FIRMWARE, DRIVER
P2: PACKAGE SIZE (IN MB)
P3: AVERAGE TIME FOR INSTALLATION
P4: REBOOT REQUIREMENT (YES/NO)
P5: FIRST INSTALL OR UPGRADE
•••
PN: <PACKAGE RELATED VARIABLE>

OTA DEPLOYMENT VARIABLES (O) 204
O1: GEOGRAPHIC REGION IN WHICH SOFTWARE UPDATE WILL BE MADE AVAILABLE
O2: NUMBER OF DISTINCT PLATFORMS
O3: NUMBER OF OPERATING SYSTEMS
•••
OM: <DEPLOYMENT RELATED VARIABLE>

DEPLOYMENT TIMING VARIABLES (T) 206
T1: DAY OF THE WEEK (E.G., WEEKDAY VS. WEEKEND)
T2: TIME OF DAY (E.G., MORNING, AFTERNOON, EVENING)
T3: MONTH
T4: SEASON
•••
TQ: <TIMING RELATED VARIABLE>

DEVELOPMENT VARIABLES (D) 208
D1: PROVIDER (E.G., INTERNAL TEAM, VENDOR, ...)
D2: TEAM/DEPARTMENT
D3: LEAD DEVELOPER
D4: ARCHITECT
•••
DR: <DEVELOPMENT RELATED VARIABLE>

VALIDATION VARIABLES (P) 210
V1: VALIDATION (E.G., INTERNAL, ODM, VENDOR, ...)
V2: VALIDATION TEAM
V3: VALIDATION MANAGER
V4: NUMBER OF UNIQUE CONFIGURATIONS THAT WERE TESTED
V5: NUMBER OF VALIDATION PASSES BEFORE APPROVAL
•••
VS: <VALIDATION RELATED VARIABLE>

$$S = f(P, O, T, D, V)$$
(Risk Score S)

$$X = \begin{bmatrix} P_{11} & P_{21} & \ldots & O_{} & O_{} & \ldots & T_{} & T_{} & \ldots & D_{} & D_{} & \ldots & V_{**} & \ldots & V_{S1} \\ P_{12} & \ldots & & & & & & & & & & & & & \\ P_{13} & \ldots & & & & & & & & & & & & & \\ & \ldots & & & & & & & & & & & & & \\ P_{1N} & \ldots & & & & & & & & & & & & & V_{SN} \end{bmatrix}$$

$$\beta = \begin{bmatrix} \beta_0 \\ \beta_1 \\ \ldots \\ \beta_N \end{bmatrix}$$

FIG. 3

PREDICTING A SUCCESS RATE OF DEPLOYING A SOFTWARE BUNDLE

BACKGROUND OF THE INVENTION

Field of the Invention

This invention relates generally to computing devices and, more particularly to determining a success of deploying a software bundle to multiple computing devices.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A manufacturer of computing devices, such as desktops, laptops, and tablets, may periodically provide software bundles that are to be installed on computing devices that have been acquired (e.g., purchased or leased) by users. For example, a manufacturer, such as, for example, Dell®, may deliver thousands of software bundles (SWB) each year over the air (OTA) to over 45 million Dell systems. Due to the numerous ways in which computing devices can be configured (e.g., by varying the type of processor, amount of main memory, type of disk drive, size of disk drive, type of graphics card, operating system, and the like), the manufacturer may be unable to test a software update under all possible variations and configurations. Prior to deploying a software update, the manufacturer may perform testing for the most common configurations. The manufacturer may make a software update available and observe the success rate (and failure rate) of the software update. If the software update has a relatively high failure rate, the manufacturer may halt deployment of the software update and conduct further tests and verification. If the software update has a relatively high success rate, the manufacturer may continue to deploy the software update. However, such a "push [the software update] and pray" strategy may inconvenience customers.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a server may determine a plurality of variables associated with a software package to be used to update a software application, a driver, a BIOS, or a firmware of a hardware component of a computing device. For example, the plurality of variables may include a size of the software package, a reboot variable associated with the software package indicating whether a reboot is to be performed after installing the software package, and an installation type indicating whether the software package is a first install or an upgrade. The server may execute a machine learning model to determine, based on the plurality of variables, a risk score predicting an installation success rate of the software package. The server may select a deployment strategy from a plurality of deployment strategies based at least in part on the risk score and the plurality of variables. The server may provide the software package to a plurality of computing devices in accordance with the deployment strategy.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 2 is a block diagram illustrating an example of predictor variables used to determine a risk score associated with a software update, according to some embodiments.

FIG. 3 is a block diagram illustrating examples of predictor variables used to train a machine learning algorithm, according to some embodiments.

DETAILED DESCRIPTION

Figure 1:
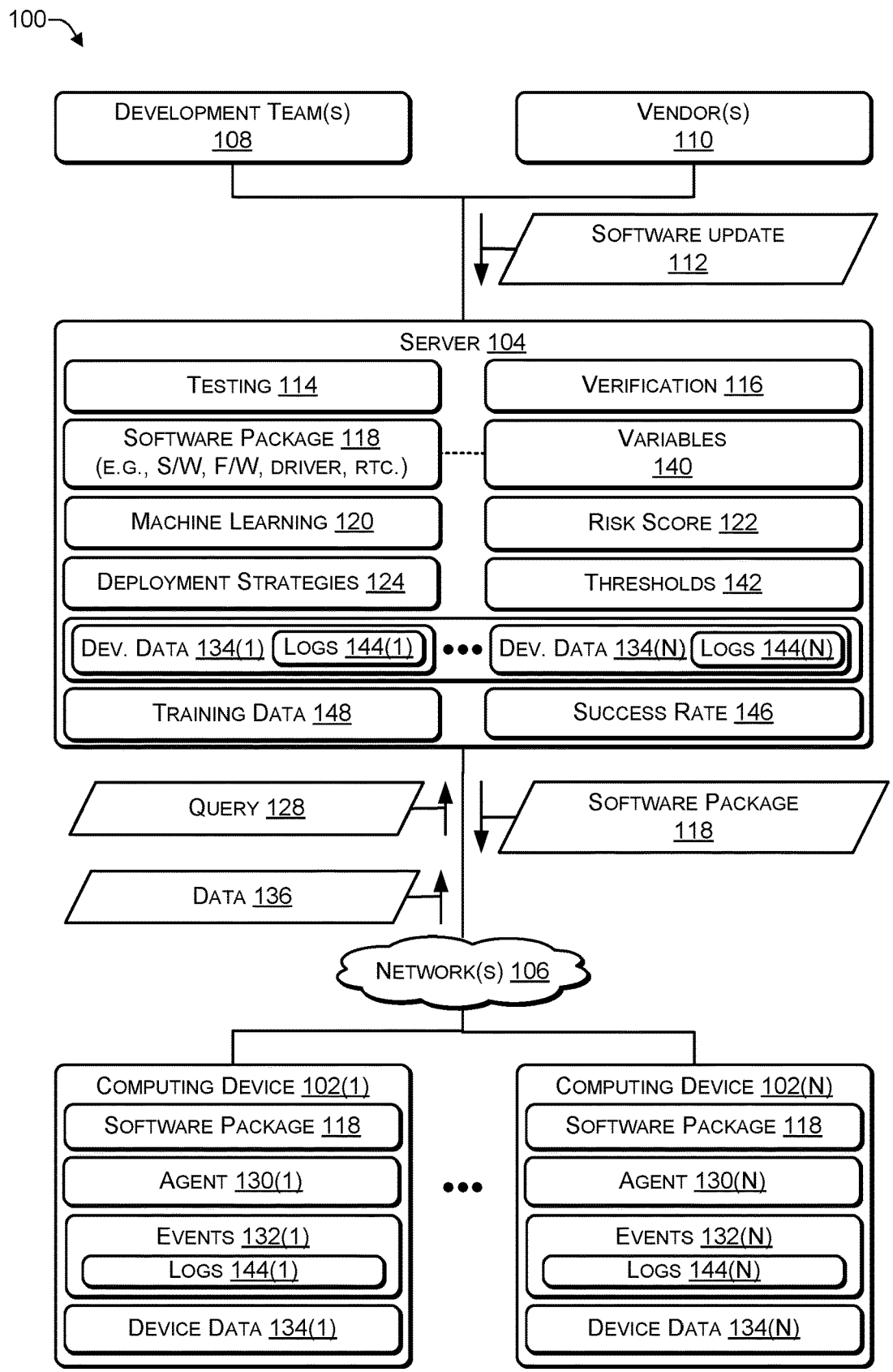
FIG. 1 is a block diagram of a system that includes a server to determine a risk score associated with a software update prior to deploying the software update, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques determine a risk score associated with a software update prior to the software update being provided to multiple computing devices. The software update may include a software application update, a driver update, a firmware update, a basic input output system (BIOS) update, a software patch, another type of software update, or any combination thereof. The risk score may be determined by taking into account various variables associated with the software update. For example, the variables associated with the software update may include software package variables, deployment variables, deployment timing variables, development variables, and validation variables. The software package variables may include the type of package, such as, for example, native application, universal application, BIOS, driver, or the like), the size of the software update (in megabytes (MB)), average installation time (in seconds), whether or not a reboot is required after installation, and the like. The deployment variables may include which geographic regions are being targeted by the software update, the number of distinct platforms being targeted by the software update, the number of operating systems being targeted, and the like. The deployment timing variables may include whether the OTA will take place on the weekend or a weekday, a time of the month and/or year when the software update will be deployed, and the like. The development variables may include whether the software update was developed internally (e.g., by the manufacturer of the computing device) or by a vendor (e.g., graphics chip vendor, wireless card vendor, and the like), and the like. If developed internally, the development variables may include the name of the development team, the lead developer, the lead architect, and other information related to members of the development team. The validation variables may include whether the validation was performed by an external vendor or internally (e.g., by the manufacturer of the computing device), and the like. If internally validated, the validation variables may include the name of the validation team, the manager of the validation team, the number of unique configurations that were tested, the number of validation passes that were performed before the software update was approved, and the like.

If the risk score indicates that the software update is predicted to be successful, then the software update may be provided to a majority (e.g., at least 50%) of the multiple computing devices. If the risk score indicates that the software update is predicted to be unsuccessful, then the software update may undergo additional modification, testing, and verification. If the risk score indicates that the software update is predicted to be somewhat successful, then one or more mitigation strategies may be selected and used. One mitigation strategy may be to determine which variable(s) are adversely affecting the risk score and deploy the software update taking the most influential variable(s) into account. For example, the software update may be fairly large in size and may be prone to failure in regions that have low bandwidth internet connectivity. In this example, the software update may initially be deployed in a particular geographic region, such as North America, because most users in this region tend to have high bandwidth internet connections, before deploying the software update in other regions. As another example, the software update may install more successfully on a latest version of an OS as compared to older versions of the OS. In this example, the software update may initially be deployed to devices with the latest version of the OS, before deploying the software update to devices with older versions of the OS. As yet another example, the software update may install more successfully on a particular product line. In this example, the software update may initially be deployed to the particular product line, before deploying the software update to other product lines.

The risk score for a particular software update may be predicted (e.g., determined) using a machine learning model that has been trained using the success rates of previous software updates. For example, the Random Forest algorithm may be used as the prediction model to achieve the desired accuracy acceptable to the business. In some cases, the variables associated with a software update may be used to perform recursive partitioning of the data using a conditional inference tree. The systems and techniques described herein may use any type of supervised machine learning model where the machine learning model learns weights and coefficients from data that includes historical success rates and related information may be used.

Thus, a machine learning model may be trained to predict a success rate of a software update. The machine learning model may be trained using historical data associated with previous software updates. The machine learning model may take into consideration multiple variables, such as, for example, software package variables, deployment variables, deployment timing variables, development variables, and validation variables. If the success rate is predicted to be low (e.g., less than or equal to a first threshold), then the software update may be modified to address the potential issues and may undergo further test and validation, after which a subsequent success rate may be predicted for the modified software update. If the success rate is predicted to be high (e.g., greater than or equal to a second threshold), then the software update may be provided for download and installation onto many computing devices. If the success rate is predicted to be greater than the first threshold but less than the second threshold, then a mitigation strategy may be selected. For example, the software update may be rolled out in a controlled manner, taking into account the variables that are primarily affecting the predicted success rate. The controlled roll out may include providing the software update for download and installation onto a first subset of the computing devices, then to a second subset of the computing devices, and so on. In this way, a manufacturer of computing devices can provide software updates to customers in such a way that the software updates are more likely to be successfully deployed, thereby increasing customer satisfaction and reducing costs by reducing the number of requests (e.g., via telephone, instant messaging, or email) to support staff.

For example, a server may include one or more processors and one or more non-transitory computer readable media (e.g., memory) storing instructions that are executable by the one or more processors to perform various operations. For example, the operations may include receiving a software update and creating a software package for deployment to multiple computing devices. The software package may be provided by a manufacturer of the computing device or by a vendor supplying hardware components or software applications to the manufacturer. The software package may include the software update and additional files that the software update may be depend on (e.g., .NET framework, DirectX drivers, or the like). The software update may include a driver, a firmware update (e.g., to a hardware component of the computing devices), a basic input output system (BIOS) update, a software application update, or any combination thereof. The firmware update may be applied to a hardware component of the computing devices, such as, for example, a network interface card, a wireless interface card, a solid-state drive (SSD), or the like. The operations may include determining a plurality of variables associated with a software package. For example, the plurality of variables may include at least a size of the software package, a reboot variable associated with the software package indicating whether a reboot is to be performed after installing the software package, and an installation type indicating whether the software package is a first install or an upgrade to a previously installed software package. In some cases, the plurality of variables may include at least one of: a provider variable identifying a provider of the software package (e.g., the provider may be a manufacturer of the computing devices or a vendor to the manufacturer), a validation variable indicating a number of validation passes associated with the software package prior to the software package passing a validation process, an installation time variable indicating an average installation time to install the software package, a software package variable indicating whether the software package comprises a native application, a universal application, a driver, a firmware update, or a basic input/output system (BIOS), a region variable indicating one or more particular geographic regions where the software package is to be provided, a platform variable indicating one or more particular computing device platforms in which the software package is to be installed, an operating system variable indicating a particular operating system or a particular operating system version associated with the software package, or a deployment timing variable indicating when the software package is to be deployed (e.g., time of day, day of week, month of the year, season, or other time related information). In addition, the plurality of variables may include at least one of: a development team variable identifying information associated with a development team that created the software update included in the software package or a validation team variable identifying additional information associated with a validation team that validated the software package. For example, this information may be used to track which internal teams (e.g., internal to a manufacturer of the computing devices) produce software packages with high success rates.

The operations may include, determining, by a machine learning model (e.g., Random Forest or similar) that is being executed by the server, a risk score predicting an installation success rate of the software package. The risk score may be determined based at least in part on the plurality of variables associated with the software package. The operations may include selecting a deployment strategy from a plurality of deployment strategies based at least in part on: (1) the risk score and (2) the plurality of variables associated with the software package. The operations may include providing the software package to a plurality of computing devices in accordance with the deployment strategy. For example, a software package that is larger than an average size of other software packages may decrease the predicted success rate. To illustrate, in countries where network connectivity is spotty or bandwidth is limited, downloading a software package with a relatively large size may fail more often than in countries with good network connectivity and relatively high bandwidth availability. In such cases, the deployment strategy selected may include making the software package available initially in regions or countries with good network connectivity and bandwidth before making the software package available in other regions or countries. As another example, if a restart is to be performed after installing a software package, the predicted success rate may be lower than particular software packages for which a restart is not to be performed after the software package is installed. In such cases, the deployment strategy that is selected may include making the software update available to computing devices that use a particular device platform (or a current operating system) prior to making it available to other device platforms (or other operating system versions). The server may provide the software package by placing the software package in a download area and sending a notification to at least a portion of the multiple computing devices that the software package is available for download. The notifications may be sent in accordance with the selected deployment strategy. For example, the deployment strategy may include at least one of: providing the software package to a first set of computing devices located in a particular geographic region (e.g., North America, Latin America, Europe, Eastern Europe, India, China, or the like), providing the software package to a second set of computing devices that are each based on a particular computing device platform, providing the software package to a third set of computing devices that are each executing a particular operating system (e.g., Windows, Linux, or the like) or a particular version of the particular operating system (e.g., Windows 7, Windows Vista, Windows 10, or the like), or providing the software package to a fourth set of computing devices at a particular time of a day (e.g., at midnight), a particular day (e.g., Saturday or Sunday), a particular month, or a particular season. To illustrate, a manufacturer may offer multiple computing device platforms. For example, Dell® offers a consumer platform (e.g., Inspiron®), a business platform (e.g., Latitude®), a workstation platform (e.g., Precision®), and a gaming platform (e.g., Alienware®). These platforms may include laptop platforms and desktop platforms.

After the server makes the software package available, multiple computing devices may each download and install the software package. During installation, an installer application in the software package may create an installation log on each computing device that downloaded the software package. An agent on each computing device may gather data about the computing device, such as a unique identifier (e.g., serial number of service tag identifier) associated with each computing device, a hardware configuration of each computing device, an operating system installed on each computing device, software applications installed on each computing devices, installation logs, number of operating system restarts, and other device-related information. Each agent on each computing device may send the gathered data to the server. The server may thus receive multiple sets of data from multiple computing devices. The server may extract from the data installation logs associated with the installation of the software package and determine a success rate associated with the software package. The server may compare the success rate with the risk score. Based at least in part on the success rate, the risk score, and the comparison, the server may either continue to provide the software package to the plurality of computing devices or make the software package unavailable to the plurality of computing devices. For example, if the success rate is as good as or better than the predicted success rate, then the server may continue to make the software package available to enable the software package to be deployed to additional computing devices. If the success rate is not as good as the predicted success rate, then the server may stop providing the software package and the software package may undergo further testing, validation, and modification to improve the success rate. As installation logs are received from the computing devices that installed the software package, the installation logs may be added to training data associated with the machine learning model to create updated training data. The updated training data may be used to re-train the machine learning model to improve the predictive abilities of the machine learning model.

FIG. 1 is a block diagram of a system 100 that includes a server to determine a risk score associated with a software update prior to deploying the software update, according to some embodiments. FIG. 1 includes multiple computing devices 102 (1) to 102 (N) coupled to a server 104 via one or more networks 106.

One or more development teams 108 or one or more external vendor(s) 110 may provide a software update 112 to the server 104. For example, the development team 108 may include a software development team is associated with the manufacturer of the computing devices 102. The development teams 108 may be considered internal development teams as they are internal to the manufacturer of the computing devices 102. The vendors 110 may include vendors external to the manufacturer that provide hardware, firmware, software, drivers or any combination thereof to the manufacturer of the computing devices 102. For example, the vendors 110 may include vendors that central processing units (CPUs), graphic cards, wireless adapter cards, and other chip and device vendors that supply components to the manufacturer of the computing devices 102. The software update 112 may include a software application update, a software patch, a firmware update (e.g., of a hardware component), a driver, a BIOS, or any combination thereof.

After the server 104 receives the software update 112, the software update 112 may undergo testing 114 and verification 116. The testing 114 may be done to determine that the software update 112 does not have any bugs and does not cause any unexpected issues or problems. The verification 116 may be done to determine that the software update 112 addresses the issues that it is designed to address or adds the features that it is designed to provide. In some cases, after the testing 114 and the verification 116, the software update 112 maybe modified. For example, the software update 112 may repeatedly undergo testing 114, verification 116 and modification until no bugs or errors are found the software update 112 has been verified to provide the features and address the issues that it is it designed to address.

After the software update 112 has passed the testing 114 and the verification 116, the server 104 may create a software package 118 based on the software. For example, the software package 118 may be a compressed format of the software update 112 and may include any additional software (e.g., .NET framework, updated drivers, and the like) that is used by the software update 112.

The server 104 may use a machine learning module 120 to determine a risk score 122 associated with the software package 118. For example, the machine learning module 120 may use Random Forest or a similar machine learning model. The machines learning module 120 may be trained using training data 148. The model is trained in a supervised learning framework where the variables for software bundle learn the weights from previous success rates. Any supervised machine learning models can be used that fit the complexity. These include tree based models such as bagging, boosting (and its variants) and random forest. Other models that can be used include instance based models such as K-nearest neighbors, self-organizing maps. Regression based models such as logistic regression and support vector machines or artificial neural networks such as multi-layer perceptron's with deep layers. The risk score 122 may predict a success rate associated installation of the software update 112 on at least a portion of the computing devices 102. The server may determine variables 140 associated with the software package 118 and determine the risk score 122 based on the variables 140. For example, the variables 140 may include one or more of a size of the software package 112, a reboot variable associated with the software package 112 indicating whether a reboot is to be performed after installing the software package 112, and an installation type indicating whether the software package 112 is a first install or an upgrade to a previously installed software package. The plurality of variables 140 may include one or more of: a provider variable identifying a provider of the software package 112 (e.g., the provider may be a manufacturer of the computing devices 102 or one of the vendors 110), a validation variable indicating a number of validation passes that the software package 112 underwent prior to the software package 112 passing the verification 116, an installation time variable indicating an average installation time to install the software package 112, a software package variable indicating whether the software package 112 includes a native application (e.g., written in a code native to the processor of the computing devices 102), a universal application (e.g., written in an interpreted language, such as Java®), a driver, a firmware update, or a basic input/output system (BIOS), a region variable indicating one or more particular geographic regions where the software package 112 is to be provided, a platform variable indicating one or more particular computing device platforms in which the software package 112 is to be installed, an operating system variable indicating a particular operating system or a particular operating system version associated with the software package 112, or a deployment timing variable indicating when the software package 112 is to be deployed (e.g., time of day, day of week, month of the year, season, or other time related information). The variables 140 may include at least one of: a development team variable identifying information associated with a development team that created the software update 112 included in the software package 118 or a validation team variable identifying additional information associated with a validation team that validated (e.g., performed the verification 116 of) the software package 112.

In some cases, the risk score 122 may be scaled to be between 0 and 100, with 0 indicating a low risk (e.g., very high predicted success rate) and 100 indicating a high risk (e.g., very low predicted success rate). In other cases, the risk score 122 may be scaled to be a fractional value between 0 and 1, with 0 indicating a low risk (e.g., very high predicted success rate) and 1 indicating a high risk (e.g., very low predicted success rate). Of course, other scaling may also be used. For example, a reverse scale, with 100 indicating a low risk (e.g., very high predicted success rate) and 0 indicating a high risk (e.g., very low predicted success rate) may be used.

After the machine learning 120 determines the risk score 122, the server 104 may determine whether to deploy the software package 118 and how to deploy the software package 118. For example, if the risk score 122 satisfies a first threshold, indicating that the software package 118 is likely to be successfully installed, then the software package 118 may be provided to at least a portion of the computing devices 102 via the networks 106. If the risk score 122 indicates that the software package 118 satisfies a second threshold, e.g., indicating that the software package 118 is likely to have a significant number of problems when installed, then the software package 118 may undergo further testing 114, verification 116, and additional modifications to address the issues and improve the risk score 122 prior to the software package 118 being deployed. If the risk score 122 is between the first threshold and the second threshold, e.g., indicating that some computing devices may encounter issues, then a particular one of the deployment strategies 124 may be selected. For example, the deployment strategies may take those of the variables 140 that contributed to the poor risk score 122 into account to selectively roll out the software package 118. For example, if the software package 118 is fairly large in size as compared to other software packages, in regions where network connectivity is poor or there is limited bandwidth, the large size may cause the software package 118 to fail to download and may require multiple downloads. In such instances, one of the deployment strategies 124 may be selected. For example, the selected deployment strategy may initially deploy the software package 118 to regions, such as, for example, North America, where a large portion of the computing devices 102 have excellent network conductivity and relatively high bandwidth, before deploying the software package 118 in other regions. One or more predetermined thresholds 142, along with one or more of the variables 140, may be used to determine which of the deployment strategies 124 is to be selected. For example, if the risk score 122 is below a first of the thresholds 142, then the software package 118 may undergo addition testing 114, verification 116, and modification until the risk score 122 improves. If the risk score 122 is greater than or equal to a second of the thresholds 142, then the software package 118 may be deployed to at least a portion of the computing devices 102. If the risk score 122 is between the first and the second of the thresholds 142, then one of the deployment strategies 124 may be selected based at least partly on the risk score 122 and the variables 140.

One of the deployment strategies 124 may include deploying the software package 118 to geographic region 1, followed by region 4, followed by region 2, followed by region 6, and so on. Another of the deployment strategies 124 may include deploying the software package 118 to computing platform 1, followed by computing platform 2, followed by computing platform 3, and so on. Yet another of the deployment strategies 124 may include deploying the software package 118 to a first version (e.g., Windows® 10) of an operating system, followed by a second version (e.g., Windows Server) of the operating system, and so on. Another of the deployment strategies 124 may include deploying the software package 118 to a first region in a first month, followed by deploying to a second region in a second month, and so on.

Each of the computing devices 102 may include a corresponding agent 130, events 132, and device data 134. The agent 130 may gather information about corresponding computing device 102, include the device data 134 and the events 132 occurring on the computing device 102. The events 132 may include for example, information about events that have occurred on the computing device 102, including installation logs 144, how many restarts occurred, how many application crashes occurred, and the like. The device data 134 may include information associated with each of the corresponding computing devices 102, such as a software configuration, a hardware configuration, one or more software applications installed on the computing device 102, which of the applications are being used and how often each of the software applications are being used, which hardware components of the computing device 102 are being used, and how often, which peripheral devices are connected to the computing device 102, and other computing device related information. The agent 130 may gather the events 132 and the device data 134. The agent 130 may periodically send data 136 that includes the events 132 and the device data 134, to the server 104.

In some cases, the agent 130 may periodically send a query 128 to the server 104 asking the server 104 if new software or a software update is available for download. After the server 104 receives the quarry 128, then the server 104 may make the software package 118 available for download. For example, the server 104 may make the software package 118 available for one or more of the agents 130 to download to their corresponding one of the computing devices 102.

An installer of the software package 118 may create an installation log (e.g., one of the logs 144). The installation log may include information as to whether the software package 118 was successfully installed and any issues or errors encountered during the installation. The agent 130 may periodically send the device data 134, in the form of the data 136, to the server 104. The server 104 may store the device data 134(1) to 134(N) in a storage device of the server 104. The server 104 may extract the installation logs (e.g., one of the logs 144) associated with the software package 118 from the data 134. The server 104 may determine an actual installation success rate 146 of the software package 118 based on the installation logs associated with the software package 118. The server 104 may compare the success rate 146 to the risk score 122 and determine whether the success rate 146 is (1) better than what was predicted by the risk score 122, (2) about the same (e.g., within a particular tolerance) as what was predicted by the risk score 122, or (3) worse than what was predicted by the risk score 122. If the server 104 determines that the success rate 146 is either better than what was predicted by the risk score 122 or about the same (e.g., within a particular tolerance) as what was predicted by the risk score 122, then the server 104 may continue to provide the software package 118 for download. If the server 104 determines that the success rate 146 is worse than what was predicted by the risk score 122, then the server 104 may stop deploying the software package 118 for download, and the software package 118 may undergo further testing 116 and verification 116.

The device data 134(1) to 134(N) may be added to the training data 148 that was used to train the machine learning module 120. The training data 148 with the added device data may be used to re-train the machine learning module 120. The device data 134 may include information about each computing device, such as which operating system and which version of the operating system is currently installed, which software applications are installed, which computing platform each computing device is based on, and the like. In this way, the machine learning module is able to further correlate the device data 134 with the success rate 146.

Thus, a software update created by a development team internal to a computer manufacturer or by an external vendor may be provided to a manufacturer. The manufacturer may perform testing and verification of the software update and create a software package based on the software update. The server may package the software update with other software (e.g., .NET framework and the like) used by the software update to create a software package. For example, the software package may include an installer application to install the software update. A server of the manufacturer may determine variables associated with the software package, including a size of the software package, whether a restart is to be performed after the software package is installed, and the like. The server may determine, based on the variables, a risk score associated with the software package. The risk score may predict a success rate associated with installing the software package on multiple computing devices. For example, a high-risk score may indicate a high risk that the software package will be unsuccessful while a low risk score may indicate a low risk that the software package will be unsuccessful during installation. Based on the risk score and based on the particular variables that have the most influence on the risk score, the server may select a particular deployment strategy. For example, the deployment strategy may perform a selected rollout to reduce the influence of the variables that have the most adversely effect on the risk score. To illustrate, if a particular operating system (or operating system version) is decreasing the risk score, the software package may initially be deployed to those computing devices that have a particular operating system (or a latest version of a particular operating system) before being deployed to computing devices with other operating systems (or other versions). As another illustration, if a particular computing device platform, such as a consumer platform, is adversely influencing the risk score, the software package may initially be deployed to a workstation platform (e.g., Dell® Precision), followed by deployment to a business platform (e.g., Dell® Latitude), and then deployed to a consumer platform (e.g., Dell® Inspiron).

The server may determine variables associated with the software package and determine a risk score based on the variables. The risk score and the variables (that influence the risk score) may be used to select a deployment strategy from multiple deployment strategies. The deployment strategy may be used to selectively deploy the software package to subsets of computing device, e.g., the software package may be deployed by region, by country, by device platform, by operating system, and the like. The deployment may include placing the software package in a download area and either (1) sending a message instructing an agent installed on each computing device to download and install the software package or (2) in response to receiving a query from the agent asking if an update is available, send the computing device a download link to the software package in the download area.

After the agent has downloaded the software package, the agent may install the software package by executing an installer application in the software package. The installer may create an installation log indicating whether the installation was successful and identifying errors and issues during the installation process. The agent may gather data about the computing device, including the computing platform (e.g., hardware), the operating system and version, events that occurred on the computing device (including logs, such as the installation log), and the like. The agent may periodically send the gathered data to the server. The server may analyze the installation logs to determine whether at least a threshold percentage of the computing devices have successfully installed the software package. If at least the threshold percentage of the computing devices have successfully installed the software package, then the server may continue to provide the software package for download. If less than the threshold percentage of the computing devices have successfully installed the software package, then the server may discontinue providing the software package for download and further testing and verification may be performed. The data sent by each agent may be added to training data to create updated training data and the updated training data used to re-train the machine learning module. In this way, the success (or failure) of each software package may be used to further refine and improve prediction accuracy of the risk score.

FIG. 2 is a block diagram 200 illustrating an example of predictor variables (e.g., the variables 140 of FIG. 1) used to determine a risk score associated with a software update, according to some embodiments. The variables 140 may include software package variables 202, OTA deployment variables 204, deployment timing variables 206, development variables 208, and validation variables 210.

The software package variables 202 may include a package type (P1), a package size (P2), an average time for installation (P3), a reboot requirement (P4), whether the software package is a first install or an upgrade (P5), and other package related information. Thus, P1, P2, P3, P4, and P5 are sub-variables of the software package variables 202. For example, the package type may indicate whether the software is a native code (e.g., x86) application or a universal application, e.g., written in Java® or another type of interpreted language. The package type may indicate whether the software package includes firmware, a driver, a BIOS update, or another type of software update. The package size may indicate (e.g., in megabytes) a size of the software package. For example, larger software packages may take more time to download, particularly in regions where network connectivity is poor or bandwidth is low. In such regions, larger software packages may have a lower success rate as the download of the software package may be started and stopped multiple times. The average time for installation adversely affect and influence the success of a software update. For example, a longer installation time may be indicative that the installation process is relatively complex and may increase the possibility of failing during installation, as compared to smaller software updates. The software package variables 202 may include whether the software update has a reboot requirement. The reboot requirement may indicate whether a reboot is to be performed after the software package is installed. For example, after an installer installs the software package, the installer may perform a reboot of the operating system. The reboot requirement may be indicative of the complexity of the software package. For example, a software package that requires a reboot of the operating system after installation may be more prone to failure during installation as compared to a software update that does not require a reboot after installation. The software package variables 202 may indicate whether the software package is a first-time installation or an upgrade to an existing installation. For example, a first-time installation installing an application for the first time may be more prone to failure as compared to upgrading an existing software installation to add new features or address one or more bugs.

The OTA deployment variables 204 may identify particular geographic regions (O1) in which the software update may be deployed (e.g., made available for download). For example, some software packages may be country specific or region specific and may not be made available around the world. To illustrate, an update to help files written in Japanese may be made available in Japan or in Asia but not in North America. The OTA deployment variables 204 may include one or more particular computing platforms (O2) that the software update is targeting. For example, the software update may be deployed to computing devices based on a particular computing platform, e.g., one of consumer (e.g., Dell® Inspiron), business (e.g., Dell® Latitude), workstation (e.g., Dell® Precision), or gaming (e.g., Dell® Alienware). To illustrate, a particular software package may update a driver of a graphics card for a gaming system and may target and be deployed to a gaming platform (e.g., Dell® Alienware) but may not target and may not be made available to consumer, business, or workstation platforms. The OTA deployment variables 204 may include one or more operating systems (e.g., Windows®, Linux, or the like) or operating system versions (e.g., Windows® 7, Windows® Vista, Windows® 10, or the like) that the software update is targeting (O3). For example, the software update may be designed to add features or address features for Windows 10 and may not be made available for computing devices with earlier versions, such as Windows® 7. The OTA deployment variables 204 may include other specific target deployment variables. For example, some software updates (e.g., drivers for a drop sensor, a touchpad, or the like) may target laptops and may not be made available for desktop devices. As another example, some software updates may target desktop computing devices but not laptop devices.

The deployment timing variables 206 may include information identifying when the software package will be made available for download, such as, for example, whether the software update is to be deployed on a weekday or a weekend, which particular day of the week (T1), and the like. For example, the software package may be made available on Tuesday at midnight (e.g., for consumers) or on Saturday at midnight (e.g., for business customers) to minimize any disruption caused by the software package being downloaded and installed. As another example, the deployment strategy may stagger the deployment of the software package throughout the week to prevent download requests from timing out due to so the download server being overwhelmed by download requests. The deployment timing variables 206 may include a time of day (T2), such as morning, afternoon, evening or a specific time such as 11:00 AM, 11:00 PM or the like. For example, if multiple updates are due to be deployed and a first update is to be installed before a second update can be installed then the first update may be provided first and then the second update may be provided at later time. The deployment timing variables 206 may include a particular month (T3), a particular season (T4), or other timing related information for the deployment of the software package. For example, a software package may be rolled out prior to a particular season, such as prior to the start of colleges or universities as the software or maybe used by a particular learning software.

The deployment variables 208 may include information about a provider of the software update, such as whether the provider (D1) is an internal team or an external vendor, a team/department (D2) that created the software update, a lead developer (D3) of the software update, an architect (D4) of the software update, and other development related information. For example, historical data may reveal that some vendors provide software updates that are well tested and verified and typically install without any issues (or with minimal issues). On the other hand, historical data may show that other vendors supply software updates that have not been thoroughly tested or verified and that may cause installation issues. In this way, the provider may be taken into account when determining the risk score. The team that developed the software update may be identified. For example, a manufacturer of the computing devices may provide incentives for teams or departments to develop bug free software updates. The installation success rate may be used to rate interval development teams. Teams that provide software packages that install with less than a predetermined number of installation issues may be rewarded while teams that provide software packages that install with at least a predetermined number of installation issues may be asked to revise their test and verification procedures to improve the quality of the software updates that they create.

The validation variables 210 may include information associated with how the software update was validated, such as who (V1) performed the validation (e.g., internal team or external vendor), the name of the validation team (V2), the manager (V3) of the validation team, the number of unique configurations that were tested (V4), the number of validation passes (V5) before the software update was approved for deployment, and other validation related information. For example, the machine learning model may learn that a software update that requires more than a particular number of validation passes may be more prone to installation issues and so such a software package may negatively impact the risk score.

The number of sub-variables for 202, 204, 206, 208, and 210 may vary. For example, 202 may have N sub-variables, 204 may have M sub-variables, 206 may have Q sub-variables, 208 may have R sub-variables, and 210 may have S sub-variables, where N, M, Q, R, and S are integers greater than 0 and are not necessarily equal to each other.

FIG. 3 is a block diagram 300 illustrating examples of predictor variables used to train a machine learning algorithm, according to some embodiments. For example, recursive partitioning using a conditional inference tree may be used to partition the training data 148 of FIG. 1. The predictor variables 200 illustrated in FIG. 2 may be mapped using supervising learning, such as, for example, Random Forest.

The risk score 122 (S) may be determined as a function (ƒ) of the predictor variables, e.g., the software package variables 202 (P), the OTA deployment variables 204 (O), the deployment timing variables 206 (T), the development variables 208 (D), and the validation variables 210 (P). For example, S=ƒ(P, O, T, D, V). As illustrated in FIG. 2, each of the predictor variables 200 may include multiple sub-variables. Thus, a matrix X may include the predictor variables 200, including sub-variables. β includes the coefficients that are learned by the machine learning module 120 using the training data 148 during the training process. In some cases, such as when using linear regression or logistic regression, the matrix X may be multiplied by β to determine the function $f=\beta_0 P_{11} + \ldots \beta_1 P_{12} \ldots$ and so on.

Figure 4:
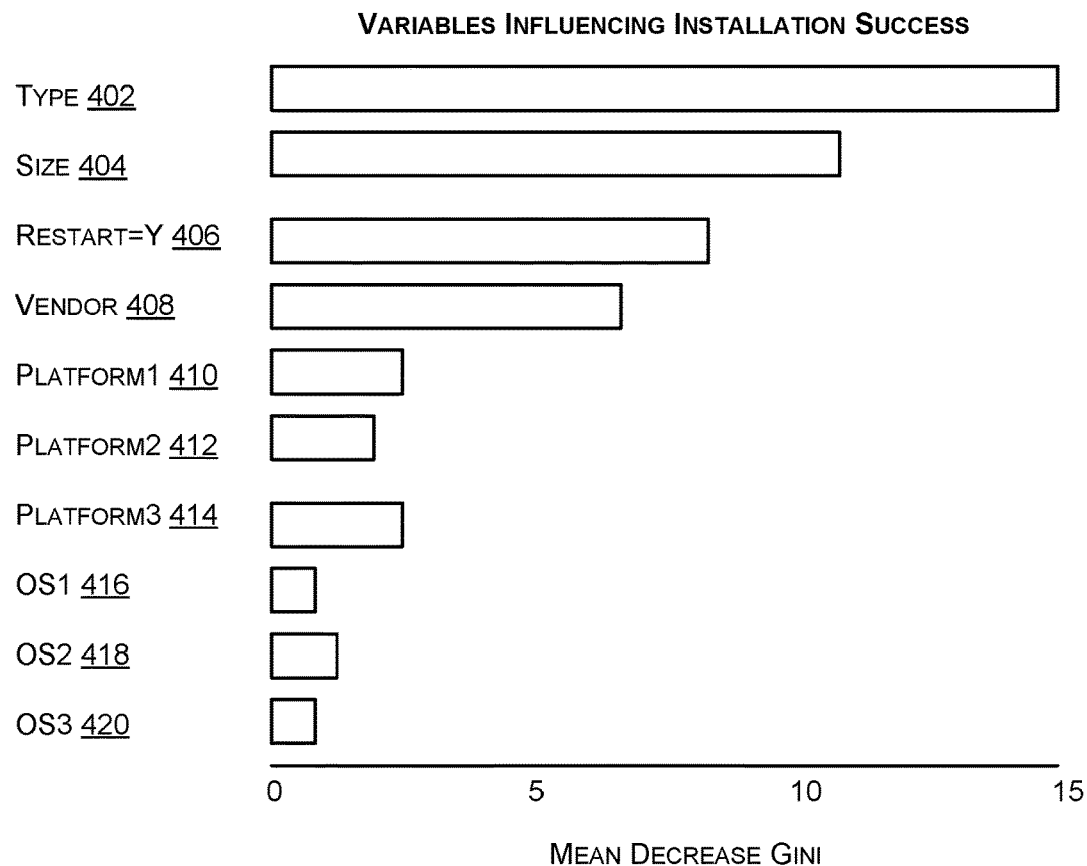
FIG. 4 is a block diagram illustrating an analysis of predictor variables and each predictor variable's influence on a successful installation of a software update, according to some embodiments

FIG. 4 is a block diagram 400 illustrating an analysis of predictor variables and each predictor variable's influence on a successful installation of a software update, according to some embodiments. The y-axis may include various variables that influence installation success (and hence the risk score 122 of FIG. 1). The x-axis may include a mean decrease Gini, e.g., a coefficient measuring how each variable contributes to the success of the installation of the software package 118 (e.g., the homogeneity of the nodes and leaves in the resulting random forest). For example, each time a particular variable is used to split a node, the Gini coefficient for the child nodes are calculated and compared to that of the original node. Of course, in other implementations, depending on the machine learning model being used, other metrics may be used to measure the importance of individual variables.

In FIG. 4, a type 402 (e.g., driver, firmware, BIOS, or software application) of the software package 118 of FIG. 1, a size 404 of the software package 118, a restart requirement 406 of the software package 118, and a vendor 408 of the software package may significantly influence the risk score 146. As illustrated in FIG. 4, particular platforms 410, 412, and 414 that are targeted by the software package 118 of FIG. 1 may have less of an influence on the risk score 146 as compared to variables 402, 404, 406, and 408. Furthermore, in the example illustrated in FIG. 4, operating systems 416, 418, and 420 may have the least influence on the risk score 146.

Figure 5:
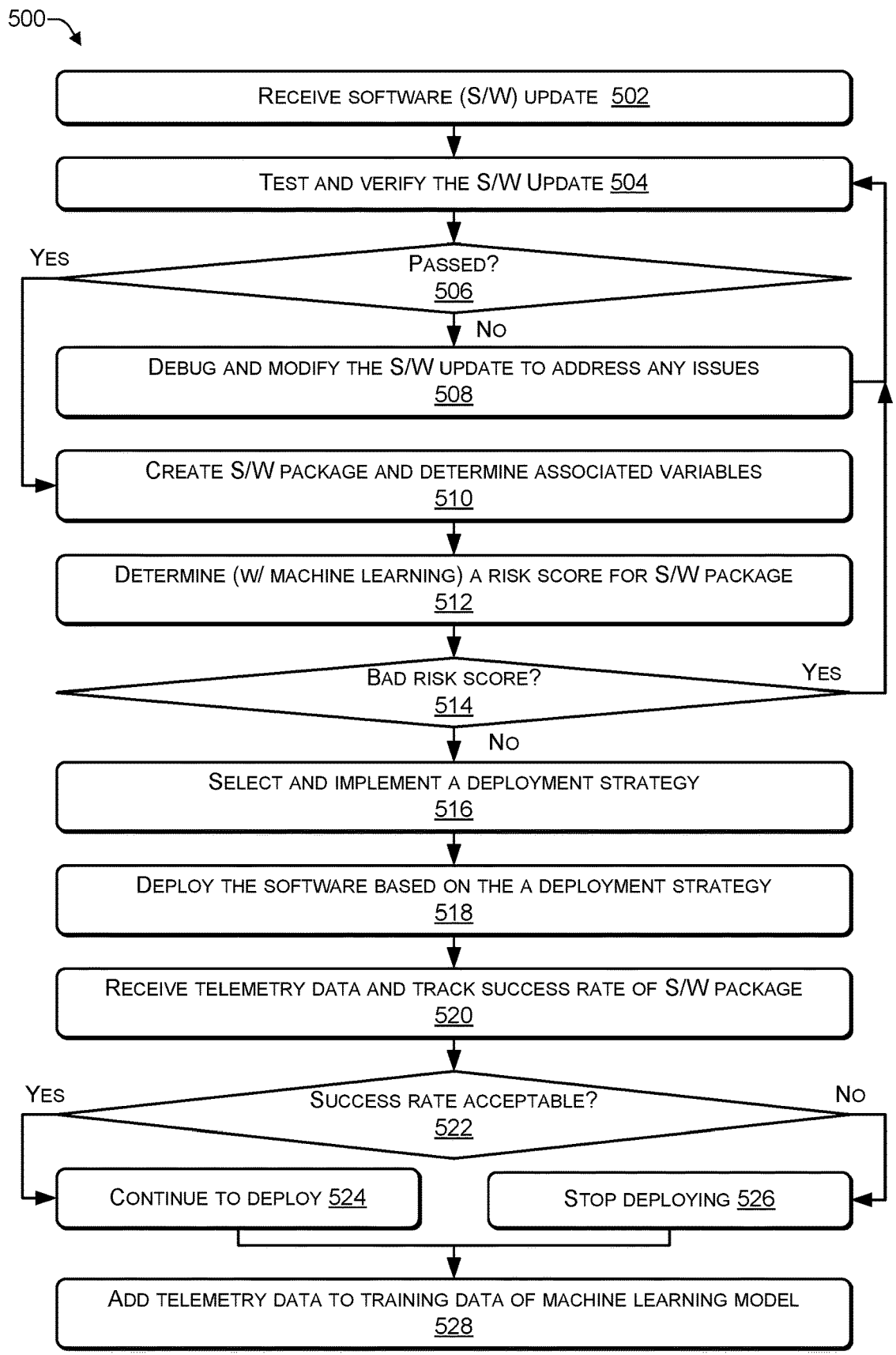
FIG. 5 is a flowchart of a process that includes determining a risk score for a software update, according to some embodiments.

In the flow diagram of FIG. 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 500 is described with reference to FIGS. 1, 2, 3, and 4, as described above, although other models, frameworks, systems and environments may be used to implement this process.

FIG. 5 is a flowchart of a process 500 that includes determining a risk score for a software package, according to some embodiments. The process 500 may be performed by one or more components of the server 104 of FIG. 1.

At 502, a software update may be received. At 504, the software update may be validated and tested. At 506, a determination may be made whether the software passed the testing and validation. If a determination is made, at 506, that the software passed the test process and the verification process, then the process may proceed to 510. If a determination is made, at 506, that the software did not pass the test and/or verification processes, then the process may proceed to 508, where the software may be debugged and modified to address any issues, after which the process may proceed back to 504. The process may repeat 504, 506, 508 until the software update passes the test and verification processes. For example, in FIG. 1, the server 104 may receive the software update 112 from an internal development team 108 or from an external vendor 110. The server 104 may perform the testing 114 and the verification 116 on the software update 112 and until the testing 114 and the verification 116 passes, indicating that the software 112 is ready for deployment.

At 510, a software package may be created (e.g., based on the software update) and one or more variables associated with the software update may be determined. For example, in FIG. 1, the server 104 may create the software package 118 that includes an installer and files associated with or used by the software update. The server 104 may determine the variables 140 (as described above) associated with the software package 118.

At 512, a machine learning module may be executed to determine a risk score for the software package. At 514, a determination may be made whether the risk score is bad (e.g., indicating a poor success rate for the installation of the software package). If a determination is made, at 514, that the risk score is bad, then the process may proceed to 504, where additional testing and verification may be performed. If a determination is made, at 514, that the risk score is not bad (e.g., indicating an excellent success rate for the installation of the software package), then the process may proceed to 516, where a deployment strategy may be selected and implemented. For example, in FIG. 1, the machine learning module 120 may determine the risk score 122 based on the variables 140 associated with the software package 118. If the server 104 determines that the risk score 122 does not satisfy a predetermined threshold, e.g., indicating that the success rate is predicted to be below a predetermined amount, then instead of being deployed the software package 118, the software package 118 may undergo further testing 114 and verification 116. If the server 104 determines that the risk score 122 satisfies the predetermined threshold, e.g., indicating that the success rate is predicted to be at least a predetermined amount, then the server 104 may select one of the deployment strategies 124 and deploy the software package 118 to the computing devices 102. The server 104 may select a particular deployment strategy from the multiple deployment strategies 124 based in part of a subset of the variables 140 that have the most negative influence on the risk score 122. For example, assume the size 404 of FIG. 4 has the most influence on the risk score 122, e.g., because a large software package may encounter download issues in countries where network connectivity is poor or bandwidth is low, causing a low installation rate. In such cases, the deployment strategy that is selected may initially provide the software package 118 in a particular region, such as North America, where network connectivity is excellent and bandwidth is relatively high, before providing the software package 118 in other regions.

At 520, telemetry data (e.g., including installation logs for the software package 118) may be received (e.g., from computing devices that downloaded and installed the software package 118) and used to track a success rate of the software package. At 522, a determination may be made whether the success rate is acceptable. If a determination is made, at 522, that the success rate is acceptable, then the process may proceed to 524, where the deployment of the software package may continue. If a determination is made, at 522, that the success rate is unacceptable, then the process may proceed to 526, where the deployment of the software package may be stopped. For example, in FIG. 1, the software package 118 may be downloaded and installed on one or more of the computing devices 102. During installation, an installation log may be created that includes information as to a success or failure of the installation process and any errors/issues encountered. The agent 130 may gather the device data 134, including the logs 144 (including installation logs associated with installing the software package 118). Periodically, the agent 130 may send the device data 134 to the server 104. The server 104 may extract, from the device data 134, the installation logs associated with the installation of the software package 118. As new installation logs are received, the server 104 may recalculate the success rate 146 and determine if the success rate 146 is acceptable (e.g., satisfies one of the thresholds 142) or unacceptable (e.g., does not satisfy one of the thresholds 142). If the success rate 146 is acceptable, then the server 104 may continue to deploy the software package 118. If the success rate 146 is unacceptable, then the server 104 may stop deploying the software package 118 and the installation logs may be analyzed to identify the issues. The software package 118 may be modified to address the issues and undergo further testing 114 and verification 116.

At 528, the telemetry data (e.g., received from the computing devices that installed the software package) may be added to training data to create updated training data that may be used to re-train the machine learning model. For example, in FIG. 1, the device data 134 that includes information about the computing device, such as the device platform, the operating system version, the installation logs, and the like may be added to the training data 148 and used to re-train (to improve the accuracy of) the machine learning module 120.

Thus, a software update created (1) by a development team internal to a computer manufacturer or (2) by an external vendor, may be provided to a manufacturer. The manufacturer may perform testing and verification of the software update and create a software package based on the software update. The server may package the software update with other software (e.g., .NET framework and the like) used by the software update to create a software package. For example, the software package may include an installer application to install the software update. A server of the manufacturer may determine variables associated with the software package, including a size of the software package, whether a restart is to be performed after the software package is installed, and the like. The server may determine, based on the variables, a risk score associated with the software package. The risk score may predict a success rate associated with installing the software package on multiple computing devices. For example, a high-risk score may indicate a high risk that the software package will be unsuccessful while a low risk score may indicate a low risk that the software package will be unsuccessful during installation. Based on the risk score and based on the particular variables that most negatively influence the risk score, the server may select a particular deployment strategy. For example, the deployment strategy may perform a selected rollout to reduce the influence of the variables that have the most adversely effect on the risk score. To illustrate, if a particular operating system (or operating system version) is decreasing the risk score, the software package may initially be deployed to those computing devices that have a particular operating system (or a latest version of a particular operating system) before being deployed to computing devices with other operating systems (or other versions). As another illustration, if a particular computing device platform, such as a consumer platform, is adversely influencing the risk score, the software package may initially be deployed to a workstation platform (e.g., Dell® Precision), followed by deployment to a business platform (e.g., Dell® Latitude), and then deployed to a consumer platform (e.g., Dell® Inspiron). The deployment may include placing the software package in a download area and either (1) sending a message instructing an agent installed on each computing device to download and install the software package or (2) in response to receiving a query from the agent asking if an update is available, send the computing device a download link to the software package in the download area.

After an agent on a computing device has downloaded the software package, the agent may install the software package by executing an installer application in the software package. The installer may create an installation log indicating whether the installation was successful and identifying errors and issues during the installation process. The agent may gather data about the computing device, including the computing platform (e.g., hardware), the operating system and version, events that occurred on the computing device (including logs, such as the installation log), device platform, and the like. The agent may periodically send the gathered data to the server. The server may analyze the installation logs to determine whether at least a threshold percentage of the computing devices have successfully installed the software package. If at least the threshold percentage of the computing devices have successfully installed the software package, then the server may continue to provide the software package for download. If less than the threshold percentage of the computing devices have successfully installed the software package, then the server may discontinue providing the software package for download and further testing and verification may be performed. The data sent by each agent may be added to training data to create updated training data and the updated training data used to re-train the machine learning module. In this way, the success (or failure) of each software package may be used to further refine and improve prediction accuracy of the risk score.

Figure 6:
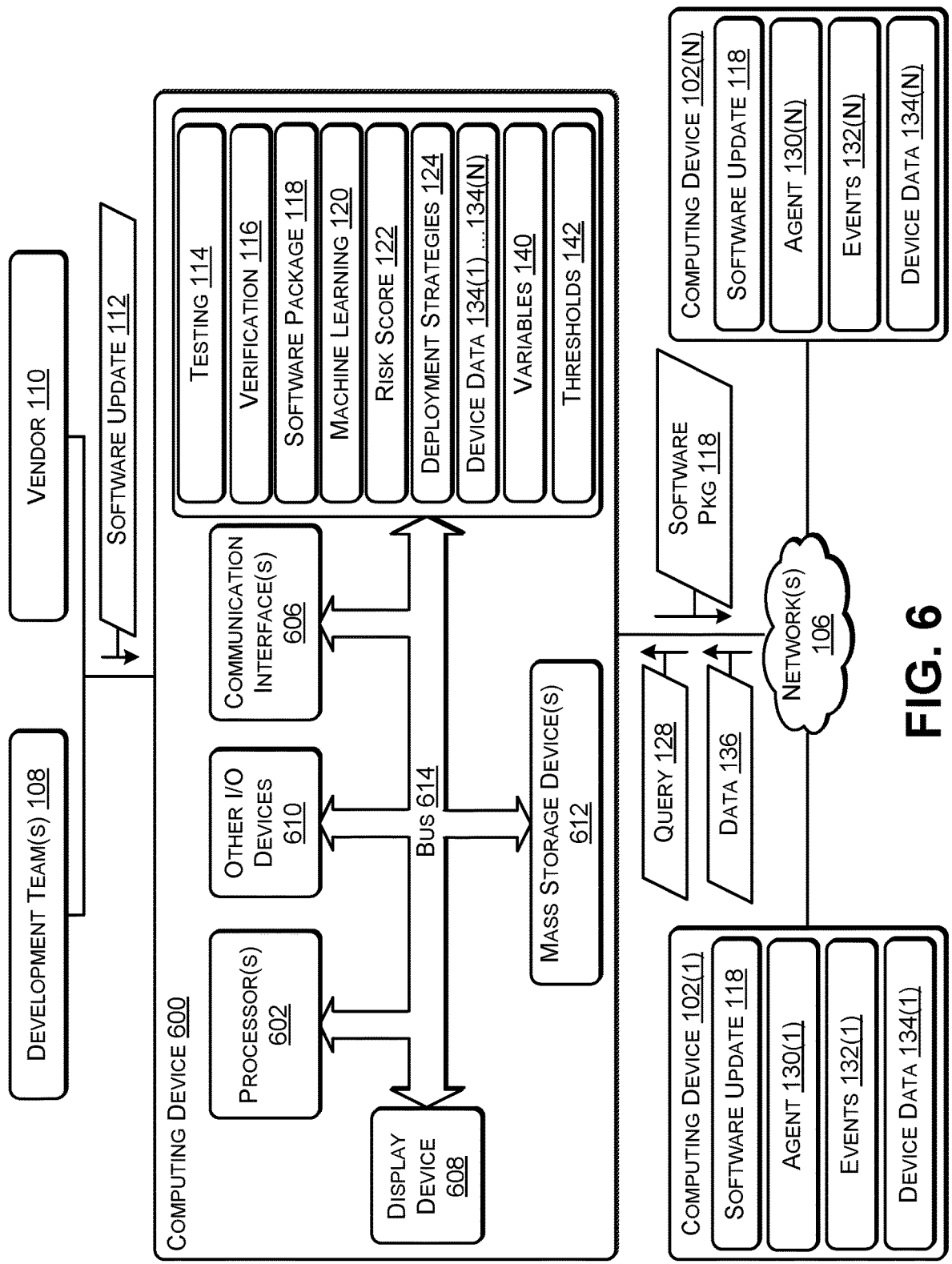
FIG. 6 illustrates an example configuration of a computing device that can be used to implement the systems and techniques described herein.

FIG. 6 illustrates an example configuration of a computing device 600 that can be used to implement the systems and techniques described herein, such as for example, one of the computing devices 102 and the server 104 of FIG. 1. For illustration purposes, the computing device 600 is illustrated in FIG. 6 as implementing the server 104 of FIG. 1.

The computing device 100 may include one or more processors 602 (e.g., CPU, GPU, or the like), a memory 604, communication interfaces 606, a display device 608, other input/output (I/O) devices 610 (e.g., keyboard, trackball, and the like), the sensors 206, and one or more mass storage devices 612 (e.g., disk drive, solid state disk drive, or the like), configured to communicate with each other, such as via one or more system buses 614 or other suitable connections. While a single system bus 614 is illustrated for ease of understanding, it should be understood that the system buses 614 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 602 are one or more hardware devices that may include a single processing unit or a number of processing units, all of which may include single or multiple computing units or multiple cores. The processors 602 may include a graphics processing unit (GPU) that is integrated into the CPU or the GPU may be a separate processor device from the CPU. The processors 602 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 602 may be configured to fetch and execute computer-readable instructions stored in the memory 604, mass storage devices 612, or other computer-readable media.

Memory 604 and mass storage devices 612 are examples of computer storage media (e.g., memory storage devices) for storing instructions that can be executed by the processors 602 to perform the various functions described herein. For example, memory 604 may include both volatile memory and non-volatile memory (e.g., RAM, ROM, or the like) devices. Further, mass storage devices 612 may include hard disk drives, solid-state drives, removable media, including external and removable drives, memory cards, flash memory, floppy disks, optical disks (e.g., CD, DVD), a storage array, a network attached storage, a storage area network, or the like. Both memory 604 and mass storage devices 612 may be collectively referred to as memory or computer storage media herein and may be any type of non-transitory media capable of storing computer-readable, processor-executable program instructions as computer program code that can be executed by the processors 602 as a particular machine configured for carrying out the operations and functions described in the implementations herein.

The computing device 600 may include one or more communication interfaces 606 for exchanging data via the network 106. The communication interfaces 606 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 606 can also provide communication with external storage, such as a storage array, network attached storage, storage area network, cloud storage, or the like.

The display device 608 may be used for displaying content (e.g., information and images) to users. Other I/O devices 610 may be devices that receive various inputs from a user and provide various outputs to the user, and may include a keyboard, a touchpad, a mouse, a printer, audio input/output devices, and so forth.

The computer storage media, such as memory 116 and mass storage devices 612, may be used to store software and data. For example, the computer storage media may be used to store the software package 118, the machine learning module 120, the risk score 122, the deployment strategies 124, the device data 134 received from the computing devices 102, the variables 140, and the thresholds 142.

Thus, the software update 112 created (1) by the development teams 108 internal to a computer manufacturer or (2) by the external vendor 110, may be provided to a manufacturer of the computing devices 102. The manufacturer may perform testing 114 and verification 116 of the software update 112 and create a software package 118 based on the software update 112. The server 104 may package the software update 112 with other software (e.g., .NET framework and the like) used by the software update 112 to create the software package 118. For example, the software package 118 may include an installer application to install the software update 112. The server 104 may determine the variables 140 associated with the software package 118, including a size of the software package 118, whether a restart is to be performed after the software package 118 is installed, and the like. The server 104 may determine, based on the variables 140, the risk score 122 associated with the software package 118. The risk score 122 may predict a success rate associated with installing the software package 118 on one or more of the computing devices 102. For example, a high-risk score may indicate a high risk that the software package 118 will be unsuccessful while a low risk score may indicate a low risk that the software package 118 will be unsuccessful during installation. Based on the risk score 122 and based on the particular variables 140 that most negatively influence the risk score 122, the server 104 may select a particular one of the deployment strategies 124. For example, the deployment strategy may perform a selected rollout to reduce the influence of the variables 140 that have the most adversely effect on the risk score 122. To illustrate, if a particular operating system (or operating system version) is decreasing the risk score 122, the software package 118 may initially be deployed to those of the computing devices 102 that have a particular operating system (or a latest version of a particular operating system) before being deployed to others of the computing devices 102 with other operating systems (or other versions). The deployment may include placing the software package 118 in a download area and either (1) sending a message instructing the agent 130 installed on each computing device 102 to download and install the software package 118 or (2) in response to receiving the query 128 from the agent 130 asking if an update is available, sending the computing device 102 a download link to the software package 118 in the download area.

After the agent 130 on one of the computing devices 102 has downloaded the software package 118, the agent 130 may install the software package 118 by executing an installer application in the software package 118. The installer may create an installation log indicating whether the installation was successful and identifying errors and issues during the installation process. Each agent 130 may gather data about the corresponding computing device 102, including the computing platform (e.g., hardware), the operating system and version, events that occurred on the computing device 102 (including logs, such as the installation log), device platform, and the like. The agent 130 may periodically send the gathered device data 134 to the server 104. The server 104 may analyze the installation logs to determine whether at least a threshold percentage of the computing devices 102 have successfully installed the software package 118. If at least the threshold percentage of the computing devices 102 have successfully installed the software package 118, then the server 104 may continue to provide the software package 118 for download. If less than the threshold percentage of the computing devices 102 have successfully installed the software package 118, then the server 104 may discontinue providing the software package 118 for download and further testing and verification may be performed. The data 136 sent by each agent 130 may be added to training data 148 and used to re-train the machine learning module 120. In this way, the success (or failure) of each software package may be used to further refine and improve prediction accuracy of the risk score.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   determining, by a server, a plurality of variables associated with a software package, the plurality of variables comprising:
      a software package variable indicating that the software package comprises one of a native application, a universal application, a driver, a firmware update, or a basic input/output system (BIOS);
      a size of the software package;
      a reboot variable associated with the software package indicating whether a reboot is to be performed after installing the software package; and
      an installation type indicating whether the software package is a first install or an upgrade to a previously installed software package;
   determining, by a machine learning model that is being executed by the server, a risk score predicting an installation success rate of the software package, the risk score determined based at least in part on the plurality of variables associated with the software package; and
   selecting, by the server, a deployment strategy from a plurality of deployment strategies based at least in part on:
      the risk score; and
      the plurality of variables associated with the software package;
   based at least in part on determining that the risk score satisfies a predetermined threshold, initiating deployment of the software package to a plurality of computing devices according to the deployment strategy of the plurality of deployment strategies;
   receiving, from one or more computing devices of the plurality of computing devices, a plurality of installation logs associated with an installation of the software package;
   determining a success rate associated with the software package based at least in part on the plurality of installation logs;
   based at least in part on determining that the success rate satisfies a success threshold, continuing deployment of the software package to the plurality of computing devices; and
   based at least in part on determining that the success rate fails to satisfy the success threshold, stopping deployment of the software package to the plurality of computing devices.

2. The method of claim 1, wherein the plurality of variables further comprise at least one of:
   a provider variable identifying a provider of the software package, the provider comprising one or more of a manufacturer of the computing device or a vendor to the manufacturer;
   a validation variable indicating a number of validation passes associated with the software package prior to the software package passing a validation process;
   an installation time variable indicating an average installation time to install the software package;
   a region variable indicating one or more particular geographic regions where the software package is to be provided;
   a platform variable indicating one or more particular computing device platforms in which the software package is to be installed;
   an operating system variable indicating one or more particular operating system versions associated with the software package; or
   a deployment timing variable indicating when the software package is to be deployed.

3. The method of claim 1, wherein the plurality of variables further comprise at least one of:
   a development team variable identifying information associated with a development team that created a software update included in the software package; or
   a validation team variable identifying additional information associated with a validation team that validated the software package.

4. The method of claim 1, wherein the machine learning model learns multiple weights and multiple coefficients from historical data comprising historical success rates associated with previous software package installations.

5. The method of claim 1, wherein the deployment strategy comprises at least one of:
   providing the software package to a first plurality of computing devices located in a particular geographic region;
   providing the software package to a second plurality of computing devices that are each based on a particular computing device platform;
   providing the software package to a third plurality of computing devices that are each executing a particular operating system or a particular version of the particular operating system; or
   providing the software package to a fourth plurality of computing devices at a particular time of a day, a particular day, a particular month, or a particular season.

6. The method of claim 1, further comprising:
   providing the installation logs and the success rate to one or more developers of the software package.

7. The method of claim 6, further comprising:
   adding the plurality of installation logs to training data associated with the machine learning model to create updated training data; and
   re-training the machine learning model based at least in part on the updated training data.

8. A server comprising:
   one or more processors; and
   one or more non-transitory computer readable media storing instructions executable by the one or more processors to perform operations comprising:
      determining a plurality of variables associated with a software package, the plurality of variables comprising:
         a software package variable indicating that the software package comprises one of a native application, a universal application, a driver, a firmware update, or a basic input/output system (BIOS);
a size of the software package;
a reboot variable associated with the software package indicating whether a reboot is to be performed after installing the software package; and
an installation type indicating whether the software package is a first install or an upgrade to a previously installed software package;
determining, by a machine learning model that is being executed by the server, a risk score predicting an installation success rate of the software package, the risk score determined based at least in part on the plurality of variables associated with the software package; and
selecting a deployment strategy from a plurality of deployment strategies based at least in part on:
the risk score; and
the plurality of variables associated with the software package;
based at least in part on determining that the risk score satisfies a predetermined threshold, initiating deployment of the software package to a plurality of computing devices according to the deployment strategy of the plurality of deployment strategies;
receiving, from one or more computing devices of the plurality of computing devices, a plurality of installation logs associated with an installation of the software package;
determining a success rate associated with the software package based at least in part on the plurality of installation logs;
based at least in part on determining that the success rate satisfies a success threshold, continuing deployment of the software package to the plurality of computing devices; and
based at least in part on determining that the success rate fails to satisfy the success threshold, stopping deployment of the software package to the plurality of computing devices.

9. The server of claim 8, wherein the plurality of variables further comprise at least one of:
a provider variable identifying a provider of the software package, the provider comprising one or more of a manufacturer of the computing device or a vendor to the manufacturer;
a validation variable indicating a number of validation passes associated with the software package prior to the software package passing a validation process;
an installation time variable indicating an average installation time to install the software package;
a region variable indicating one or more particular geographic regions where the software package is to be provided;
a platform variable indicating one or more particular computing device platforms in which the software package is to be installed;
an operating system variable indicating one or more particular operating system versions associated with the software package; or
a deployment timing variable indicating when the software package is to be deployed.

10. The server of claim 8, wherein the plurality of variables further comprise at least one of:
a development team variable identifying information associated with a development team that created a software update included in the software package; or
a validation team variable identifying additional information associated with a validation team that validated the software package.

11. The server of claim 8, wherein the deployment strategy comprises at least one of:
providing the software package to a first plurality of computing devices located in a particular geographic region;
providing the software package to a second plurality of computing devices that are each based on a particular computing device platform;
providing the software package to a third plurality of computing devices that are each executing a particular operating system or a particular version of the particular operating system; or
providing the software package to a fourth plurality of computing devices at a particular time of a day, a particular day, a particular month, or a particular season.

12. The server of claim 8, further comprising:
based at least in part on determining that the risk score fails to satisfy the predetermined threshold, initiating deployment of the software package to a second plurality of computing devices according to a second deployment strategy of the plurality of deployment strategies, wherein the second plurality of computing devices has fewer computing devices than the plurality of computing devices.

13. The server of claim 12, further comprising:
adding the plurality of installation logs to training data associated with the machine learning model to create updated training data; and
re-training the machine learning model based at least in part on the updated training data.

14. One or more non-transitory computer readable media storing instructions executable by one or more processors of a server to perform operations comprising:
determining a plurality of variables associated with a software package, the plurality of variables comprising:
a software package variable indicating that the software package comprises one of a native application, a universal application, a driver, a firmware update, or a basic input/output system (BIOS);
a size of the software package;
a reboot variable associated with the software package indicating whether a reboot is to be performed after installing the software package; and
an installation type indicating whether the software package is a first install or an upgrade to a previously installed software package;
determining, by a machine learning model that is being executed by the server, a risk score predicting an installation success rate of the software package, the risk score determined based at least in part on the plurality of variables associated with the software package; and
selecting a deployment strategy from a plurality of deployment strategies based at least in part on:
the risk score; and
the plurality of variables associated with the software package;
based at least in part on determining that the risk score satisfies a predetermined threshold, initiating deployment of the software package to a plurality of computing devices according to the deployment strategy of the plurality of deployment strategies;

receiving, from one or more computing devices of the plurality of computing devices, a plurality of installation logs associated with an installation of the software package;

determining a success rate associated with the software package based at least in part on the plurality of installation logs;

based at least in part on determining that the success rate satisfies a success threshold, continuing deployment of the software package to the plurality of computing devices; and based at least in part on determining that the success rate fails to satisfy the success threshold, stopping deployment of the software package to the plurality of computing devices.

15. The one or more non-transitory computer readable media of claim 14, wherein the plurality of variables further comprise at least one of:

a provider variable identifying a provider of the software package, the provider comprising one or more of a manufacturer of the computing device or a vendor to the manufacturer;

a validation variable indicating a number of validation passes associated with the software package prior to the software package passing a validation process;

an installation time variable indicating an average installation time to install the software package;

a region variable indicating one or more particular geographic regions where the software package is to be provided;

a platform variable indicating one or more particular computing device platforms in which the software package is to be installed;

an operating system variable indicating one or more particular operating system versions associated with the software package; or a deployment timing variable indicating when the software package is to be deployed.

16. The one or more non-transitory computer readable media of claim 14, wherein the plurality of variables further comprise at least one of:

a development team variable identifying information associated with a development team that created a software update included in the software package; or a validation team variable identifying additional information associated with a validation team that validated the software package.

17. The one or more non-transitory computer readable media of claim 14, wherein the deployment strategy comprises at least one of:

providing the software package to a first plurality of computing devices located in a particular geographic region;

providing the software package to a second plurality of computing devices that are each based on a particular computing device platform;

providing the software package to a third plurality of computing devices that are each executing a particular operating system or a particular version of the particular operating system; or providing the software package to a fourth plurality of computing devices at a particular time of a day, a particular day, a particular month, or a particular season.

18. The one or more non-transitory computer readable media of claim 14, wherein the machine learning model comprises a random forest model.

19. The one or more non-transitory computer readable media of claim 14, further comprising:

based at least in part on determining that the risk score fails to satisfy the predetermined threshold, initiating deployment of the software package to a second plurality of computing devices according to a second deployment strategy of the plurality of deployment strategies, wherein the second plurality of computing devices has fewer computing devices than the plurality of computing devices.

20. The one or more non-transitory computer readable media of claim 19, further comprising:

adding the plurality of installation logs to training data associated with the machine learning model to create updated training data; and re-training the machine learning model based at least in part on the updated training data.

* * * * *